US008656382B2

(12) United States Patent
Abdelhadi et al.

(10) Patent No.: US 8,656,382 B2
(45) Date of Patent: Feb. 18, 2014

(54) PREVENTING AN INCOMPATIBLE CLASS EXCEPTION CAUSED BY INCOMPATIBLE CLASS LOADERS

(75) Inventors: Sanaa F. Abdelhadi, Richardson, TX (US); Sandip A. Amin, Austin, TX (US); Brian David Nelson, Austin, TX (US); David Wa-Wai Nip, Hopewell Junction, NY (US); Danling Shi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2030 days.

(21) Appl. No.: 11/531,982

(22) Filed: Sep. 14, 2006

(65) Prior Publication Data

US 2008/0127155 A1   May 29, 2008

(51) Int. Cl.
*G06F 9/44* (2006.01)

(52) U.S. Cl.
USPC .......................................................... 717/166

(58) Field of Classification Search
USPC .......................................... 717/166; 719/316
See application file for complete search history.

(56) References Cited

U.S. PATENT DOCUMENTS

| | | | |
|---|---|---|---|
| 6,442,749 B1 * | 8/2002 | Hirao et al. | 717/170 |
| 6,470,494 B1 | 10/2002 | Chan et al. | |
| 6,549,955 B2 * | 4/2003 | Guthrie et al. | 719/315 |
| 7,036,110 B2 * | 4/2006 | Jeyaraman | 717/120 |
| 7,051,324 B2 | 5/2006 | Gissel et al. | |
| 7,594,237 B2 * | 9/2009 | Tankov et al. | 719/316 |
| 7,657,658 B2 * | 2/2010 | Tankov et al. | 709/250 |
| 2003/0225944 A1 * | 12/2003 | Mousseau et al. | 710/1 |
| 2006/0080435 A1 * | 4/2006 | Tankov et al. | 709/225 |
| 2007/0061796 A1 * | 3/2007 | Atsatt | 717/166 |
| 2007/0113234 A1 * | 5/2007 | Chinnappa et al. | 718/104 |

OTHER PUBLICATIONS

J2EE Connector Architecture Specification Version 1.5, Sun Microsystems, Inc., pp. 1-2, retrieved Jul. 25, 2006. http://java.sun.com/j2ee/connector/download.html.
WebSphere Application Server Version 6.0 Information Center, pp. 1-2, retrieved Jul. 25, 2006. http://public.boulder.ibm.com/infocenter/wasinfo/v6ro/index.jsp.
DERI, "Java Dynamic Class Loader", IBM Technical Disclosure Bulletin, pp. 107-108, Nov. 1996.

* cited by examiner

*Primary Examiner* — Li B Zhen
*Assistant Examiner* — Hang Pan
(74) *Attorney, Agent, or Firm* — Yee & Associates, P.C.; Steven L. Bennett

(57) ABSTRACT

A computer implemented method, apparatus, data processing system, and computer usable program code are provided for obtaining data from an application. A class loader layer is instantiated for an application. The class loader layer is an interface between the application and a resource adaptor and the class loader layer has access to all classes for the application. The function is executed to generate a set of objects with a set of data types accessible by the resource adaptor responsive to receiving a request from the resource adaptor to invoke a function in the class loader layer. Finally, the set of objects are sent to the resource adaptor.

12 Claims, 7 Drawing Sheets

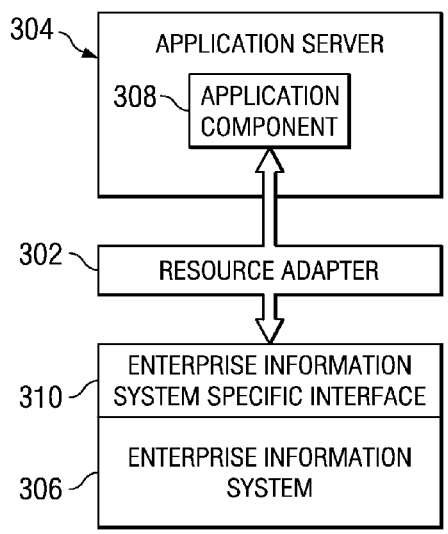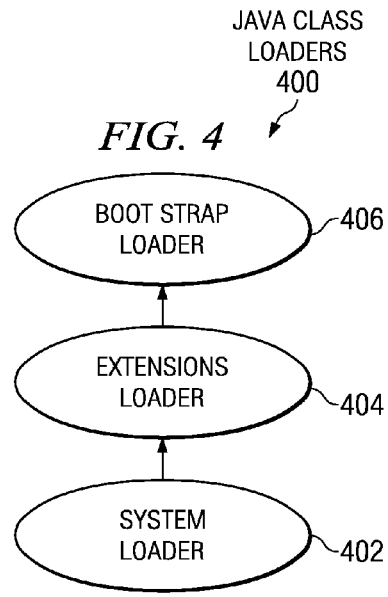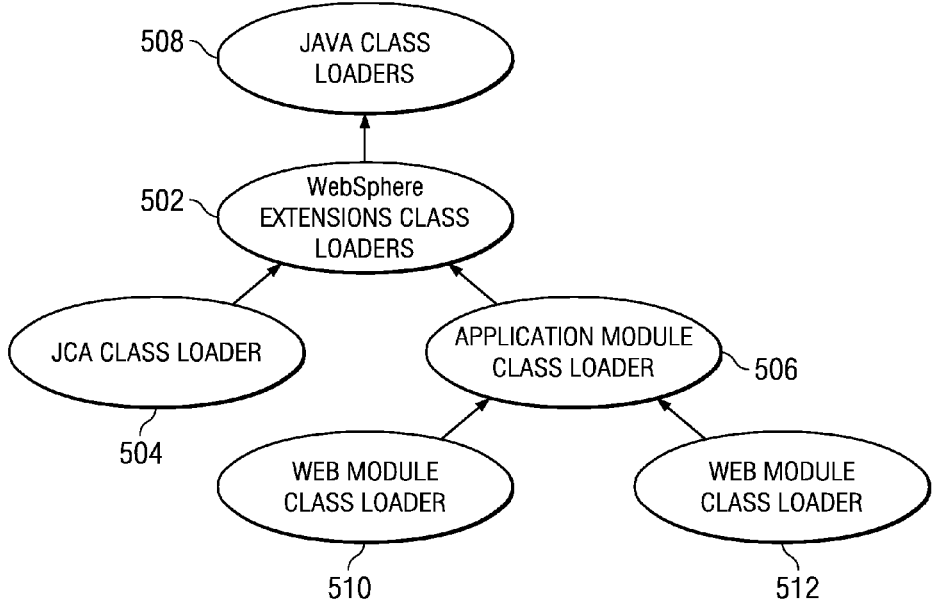

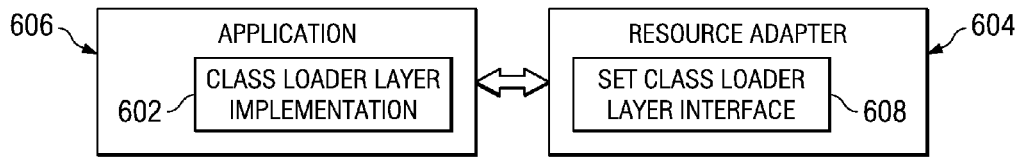

FIG. 6

```
         /************************************************************
         * TheClassLoaderLayer interface class defines the           *
         * doConversion method.                                      *
         ************************************************************/
702      public interface IClassLoaderLayer
         {
             public Object doConversion (Object arg1,
                                         Object arg2);
             . . . . . .
         }

/************************************************************
         * ClassLoaderLayer implementation class                     *
704      ************************************************************/
         public class ClassLoaderLayerImpl implements IClassLoaderLayer
         {
             /************************************************************
             * The doConversion method uses application utility class    *
             * AppUtil to perform the conversion based on the two input  *
             * parameters, and returns the converted result.             *
             ************************************************************/
             public Object doConversion  (Object arg1,
                                          Object arg2)
             {
708            // Call application utility class method to do
               // the conversion.
               // ConvertedResult is a data type defined
               // in the application.
               ConvertedResult result = AppUtil.convert(arg1, arg2) ;
               return result;
             }
             . . . . . .
         }
```

```
/*********************************************************
 * AppConnectionMgr is a class in MyApplication that      *
 * interfaces with the JCA.                               *
 *********************************************************/
public class AppConnectionMgr
{
    private JcaConnection connection = null;

/*********************************************************
     * This method makes the connection to the JCA, and then *
     * passes the ClassLoaderLayerImpl instance to the JCA.  *
     *********************************************************/
    public void makeJCAConenction()
    {
        InitialContext initCtx = new InitialContext();
        ConnectionFactory connectionFactory =
                (ConnectionFactory) initCtx.lookup(jcaJndiName);

connection = (JcaConnection)
                connectionFactory.getConnection(connectionSpec);

// create an instance of the ClassLoaderLayerImpl
        // called wrapper
        IClassLoaderLayer wrapper = new ClassLoaderLayerImpl();

// pass the ClassLoaderLayerImpl object to the JCA
        connection.setLoaderLayer(wrapper);

// call the JCA's doSomething method passing an application
        // object.
        AppReturnObject returnObject =
            AppReturnObject ) connection.doSomething((Object)appObject);
    }
```

```
/***********************************************************
 * JCAManagedConnectionImp is a class in MyJCA              *
 ***********************************************************/
public class JCAManagedConnectionImpl implements
            JCAManagedConnection
{
    private IClassLoaderLayer loadLayer = null;

public void setLoaderLayer (IClassLoaderLayer layer)
    {
        loaderLayer = layer;
    } public Object doSomething (Object data1)
    {
        Object data2;
        // call EIS API here
        // data2 = data returned from EIS // loaderLayer is the wrapper object from MyApplication
        Object result = loaderLayer.doConversion(data1, data2);
        Return result;
    }
}
```

710

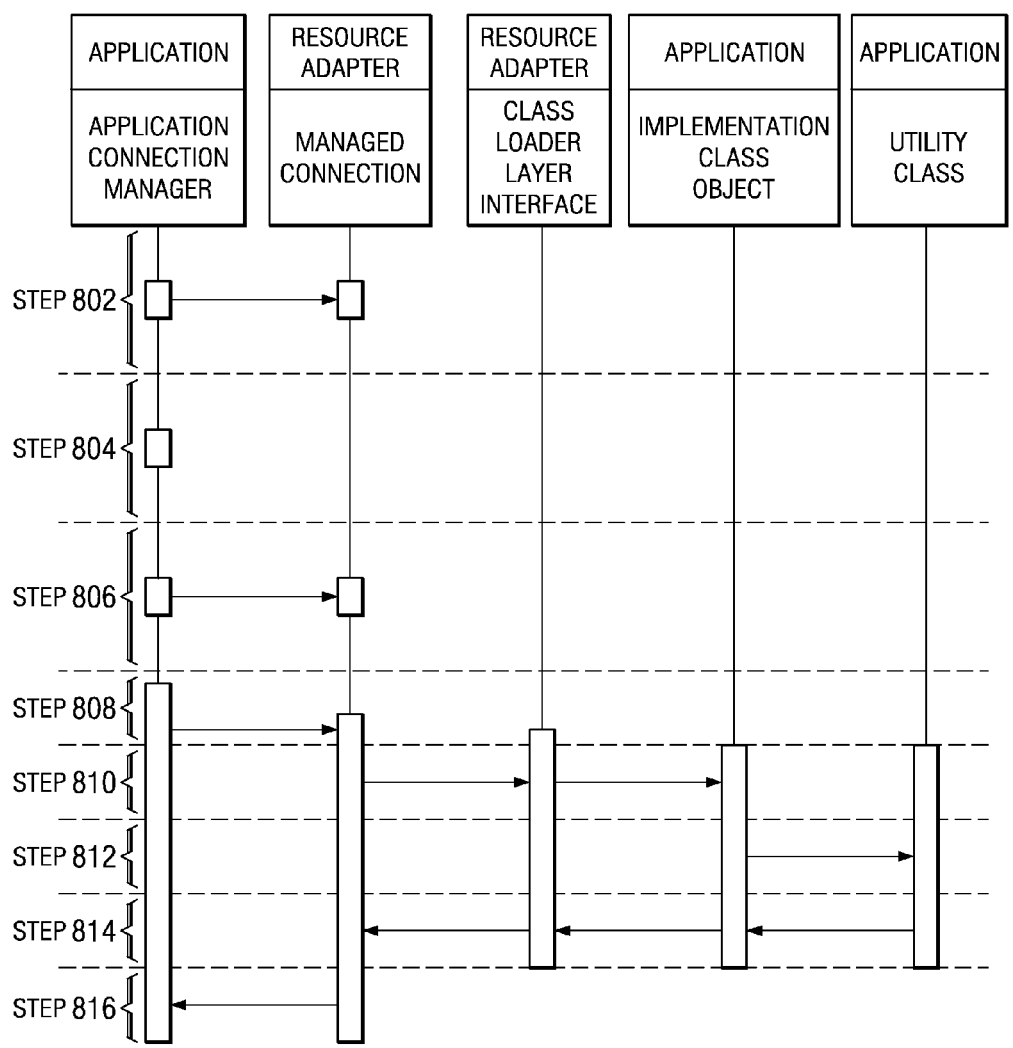

PREVENTING AN INCOMPATIBLE CLASS EXCEPTION CAUSED BY INCOMPATIBLE CLASS LOADERS

BACKGROUND OF THE INVENTION

1. Field of the Invention

The present invention relates generally to an improved data processing system and in particular to a method and apparatus for loading data. Still more particularly, the present invention relates to a computer implemented method, apparatus, data processing system, and computer usable program code for loading classes in a virtual machine.

2. Description of the Related Art

In a virtual machine, such as a Java™ Virtual Machine (JVM™), class loaders determine when a class should be loaded and where it should be loaded from. In a Java™ 2 Platform, Enterprise Edition (J2EE™) application server environment, each J2EE™ Connector Architecture (JCA) and application has its own class loader. The J2EE™ Connector Architecture is not able to access classes packaged in the application's archive (.ear module). Any dependent classes referenced by the J2EE™ Connector Architecture must be either packaged with the J2EE™ Connector Architecture archive (.rar module) or loaded by the parent classloaders. If the J2EE™ Connector Architecture needs to access any of the application's classes, then those classes must also be packaged with the J2EE™ Connector Architecture. However, when the same classes are packaged with both the J2EE™ Connector Architecture and the application, there are class-loader issues for both sides:

If application-specific classes are passed into the J2EE™ Connector Architecture, then the J2EE™ Connector Architecture may not be able to interact with those classes. A NoClassDefFoundError exception would be thrown by the Java™ Virtual Machine.

If application-specific classes are returned by the J2EE™ Connector Architecture, the application may have a similar problem.

This problem is due to the fact that Java™ Virtual Machine considers the same class loaded by two separate class loaders to have different class definitions. Since the J2EE™ Connector Architecture and the application are associated with different class loaders, exceptions will be thrown by the Java™ Virtual Machine when accessing, from either the application or the J2EE™ Connector Architecture, classes that are not loaded by a common, parent, class loader.

Current solutions package the dependent classes in a separate archive called a ".jar file". The archive can be made available as a shared library or be loaded by the parent class loader by including the archive in its classpath. The drawback of this solution is that the application has to be repackaged into two parts: the application archive and the shared library. The application archive is no longer self-contained. In addition, the shared library is available to all applications deployed on the server. This availability of the shared library may be undesirable for some applications where the archive should not be exposed to other applications.

SUMMARY OF THE INVENTION

The different aspects of the illustrative embodiments provide a computer implemented method, apparatus, data processing system, and computer usable program code for obtaining data from an application. The illustrative embodiments instantiate a class loader layer for an application. The class loader layer is an interface between the application and a resource adaptor and the class loader layer has access to all classes for the application. Responsive to receiving a request from the resource adaptor to invoke a function in the class loader layer, the illustrative embodiments execute the function to generate a set of objects with a set of data types accessible by the resource adaptor. The illustrative embodiments send the set of objects to the resource adaptor.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 illustrates a Java™ 2 Platform, Enterprise Edition (J2EE™) Connector Architecture (JCA) in accordance with an illustrative embodiment;

FIG. 4 depicts an exemplary hierarchy of class loaders in accordance with an illustrative embodiment;

FIG. 5 illustrates the class loader hierarchy in a WebSphere® application server runtime environment in accordance with an illustrative embodiment;

FIG. 6 depicts a class loader layer solution in accordance with an illustrative embodiment;

FIGS. 7A, 7B, and 7C depict exemplary code where a class loader layer interface is implemented in accordance with an illustrative embodiment;

FIG. 8 illustrates a runtime sequence using a class loader layer in accordance with an illustrative embodiment;

DETAILED DESCRIPTION OF THE PREFERRED EMBODIMENT

Figure 1:
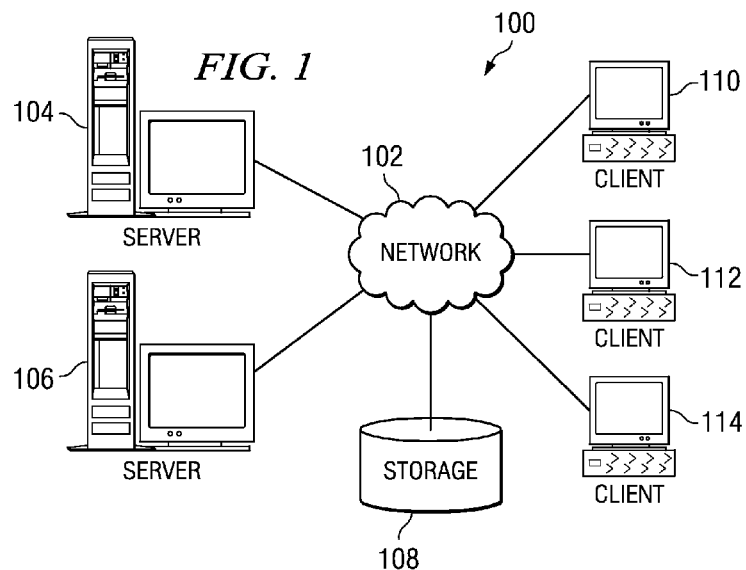
FIG. 1 depicts a pictorial representation of a network of data processing systems in which illustrative embodiments may be implemented.
Figure 2:
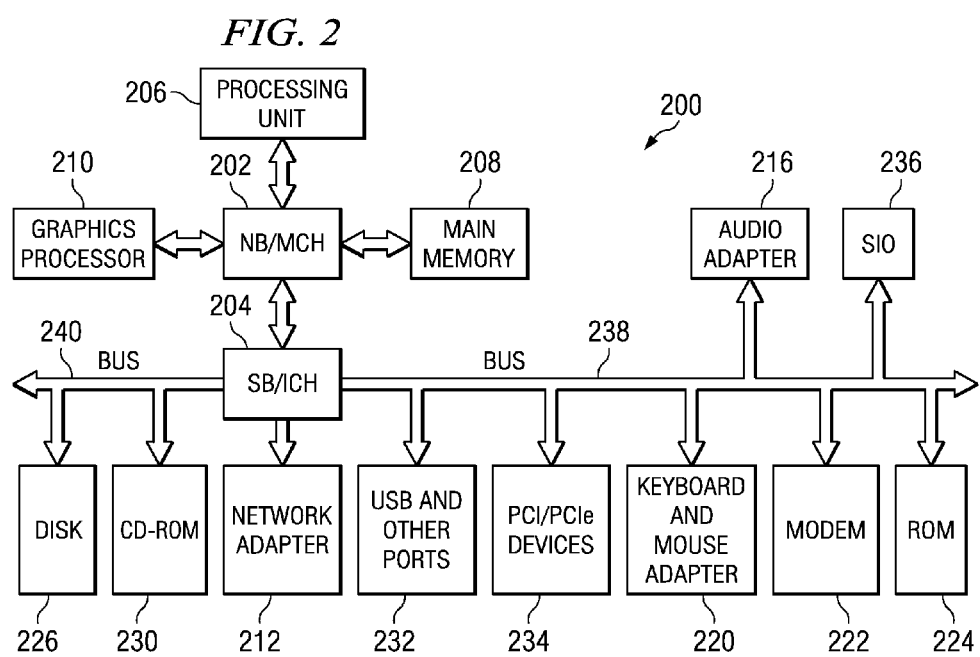
FIG. 2 depicts a block diagram of a data processing system in which illustrative embodiments may be implemented.

The illustrative embodiments provide for preventing an incompatible class exception caused by incompatible class loaders. With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adaptor 212 is coupled to south bridge and I/O controller hub 204 and audio adaptor 216, keyboard and mouse adaptor 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adaptors, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adaptor. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a class loader layer that is a helper class that acts as an interface between a J2EE™ Connector Architecture and an application that uses that J2EE™ Connector Architecture. The helper class implements the defined interface that is agreed to by both the application and the J2EE™ Connector Architecture. The helper class may be packaged with the application. The application will create an instance of the class loader layer and pass it to the J2EE™ Connector Architecture. When the J2EE™ Connector Architecture needs to access application-specific classes, it will invoke functions provided by the class loader layer. Since the class loader layer is instantiated in the application's class loader, it will have access to all of the application's classes. When the class loader layer completes its processing, it will return objects in data types that are accessible to the J2EE™ Connector Architecture.

FIG. 3 illustrates a Java™ 2 Platform, Enterprise Edition (J2EE™) Connector Architecture (JCA) in accordance with an illustrative embodiment. The J2EE™ Connector Architecture, which may also be referred to as resource adaptor 302 defines a standard architecture for connecting application server 304, such as server 104 or 106 of FIG. 1, to heterogeneous enterprise information system (EIS) 306. Resource adaptor 302 plays a central role in the integration and connectivity between enterprise information system 306 and application server 304. Resource adaptor 302 serves as the point of contact between application component 308, application server 304, and enterprise information system 306. With resource adaptor 302, a J2EE™ application may interact with enterprise information system 306 without modifying enterprise information system specific interface 310.

FIG. 4 depicts an exemplary hierarchy of class loaders in accordance with an illustrative embodiment. Java™ class loaders 400 may be part of the J2EE™ Connector Architecture or resource adaptor, such as resource adaptor 302 of FIG. 3. In a J2EE environment, class loaders 400 enable applications that are deployed on server to access available classes, libraries, and resources. Class loaders 400 are objects used to find and load class files. In these examples, class loaders 400 are comprised of system loader 402, extensions loader 404, and bootstrap loader 406 and are organized in a hierarchical order. The hierarchical order of class loaders 400 means that system loader 402 is the lowest order or subordinate loader to extension loader 404 and extension loader 404 is a lower order or subordinate to bootstrap loader 406. System loader 402 loads classes that are defined by the classpath. The classpath is an environment variable that tells the Java™ compiler javac.exe where to look for class files to import or java.exe where to find class files to interpret.

Extensions loader 404 loads the Java™ Virtual Machine extensions, such as jre/lib.ext. Bootstrap loader 406 loads the Java™ archive files that make up the Java™ virtual machine code, such as rt.jar. Each instance of class loaders 400 has an associated parent class loader except bootstrap loader 406. When requested to find a class, by default, class loaders 400 will delegate the request to its parent class loader before finding the class itself.

FIG. 5 illustrates the class loader hierarchy in an application server runtime environment in accordance with an illustrative embodiment. In these examples, the application server runtime environment may be a WebSphere® runtime environment. WebSphere® application server may be an application server, such as application server 304 of FIG. 3. WebSphere® extensions class loaders 502 of the WebSphere® application server loads the WebSphere® application server classes, standalone resource classes, custom service classes, and custom registry classes. WebSphere® extensions class loaders 502 receives classes loaded by loaders such as J2EE™ Connector Architecture (JCA) class loader 504 and application module class loader 506 and passes the class to Java™ class loaders 508. Application module class loader 506 loads classes and resources of application modules, such as Web module class loaders 510 and 512. Web module class loaders 510 and 512 load the application Web modules. Under default class loader policies, an instance of application module class loader 506 exists for each running application module and an instance of Web module class loader 510 or 512 exists for each Web module in the application.

FIG. 6 depicts a class loader layer solution in accordance with an illustrative embodiment. Class loader layer 602 is a helper class acting as an interface between resource adaptor 604, such as J2EE™ Connector Architecture or resource adaptor 302 of FIG. 3, and application 606, such as application component 308 of FIG. 3, which uses that J2EE™ Connector Architecture. Class loader layer 602 implements the defined class loader layer interface that is agreed to by both application 606 and J2EE™ Connector Architecture 604. Class loader layer 602 may be packaged with application 606. Application 606 may create an implementation class object and pass it to set class loader layer interface 608 in the J2EE™ Connector Architecture 604. When resource adaptor 604 needs to access application-specific classes, resource adaptor 604 invokes functions provided by class loader layer 602 through the implementation class object in set class loader layer interface 608. The class loader layer solution provides a way for both J2EE™ applications and J2EE™ Connector Architectures to access application-specific classes without having class-loading issues. In this illustrative embodiment, the application is still self-contained, and the application archive is not exposed to other applications.

Since the implementation class object was instantiated in application's 606 class loader, set class loader layer interface 608 has access to all of application's 606 classes through class loader layer 602. When set class loader layer interface 608 completes its processing, set class loader layer 608 returns objects in data types that are accessible to resource adaptor 604. The method input and output of class loader layer 602 must be non-application-specific data types. That is, the method signature should contain data types that are loaded by a common parent class loader, such as "java.1ang.Object" or "java.1ang.String".

FIGS. 7A, 7B, and 7C depict exemplary Java™ code where a class loader layer interface is implemented in accordance with an illustrative embodiment. In section 702, a class loader layer interface, such as class loader layer 602 of FIG. 6, interface, identified by IClassLoaderLayer, is instantiated in the resource adaptor or J2EE™ Connector Architecture. Class loader layer interface defines a set of application functions that is available for the J2EE™ Connector Architecture to access. Since the class loader layer object is accessed by both the application and the resource adaptor, the input and output of method signatures in the class loader layer interface must be data types loaded by one of the parent class loaders, such as the system class loader.

The implementation of the defined interface is done by the application and packaged with the application. However, the interface class is packaged with the resource adaptor, which gives the resource adaptor the ability to access the class loader layer methods.

In section 704, the application provides an implementation class object, identified as ClassLoaderLayerImpl, which implements the defined class loader layer interface. Since the implementation class object is loaded by the application class loader, it can reference any other classes accessible in the application. Section 706 shows that at runtime, the application creates an instance of implementation class object and passes the object to the J2EE Connector Architecture.

In section 708, an application, identified as MyApplication, has a utility class, identified as AppUtil.java, which provides a convert method that performs a conversion algorithm based on the input parameters. In section 710, the application also uses a resource adaptor, MyJCA, to access an enterprise information system (EIS). Both the application and the resource adaptor need to use the convert method in the process in section 708. In order for the resource adaptor to have access to the application's utility class, the method doConversion is defined in the class loader layer interface. In the implementation class, ClassLoaderLayerImpl, the doConversion method forwards the call to the utility class, AppUtil.convert( ).

FIG. 8 illustrates a runtime sequence using a class loader layer in accordance with an illustrative embodiment. As the sequence beings, the application may use an application connection manager or other type of manager to establish a connection to a resource adaptor, such as resource adaptor 302 of FIG. 3 (step 802). The application then creates a new instance of an implementation class object, such as ClassLoaderLayerImpl shown in section 704 of FIG. 7 (step 804).

The application then passes the implementation class object to the set class loader layer interface in the resource adaptor (step 806). The application calls the method, such as a doSomething, provided by the resource adaptor (step 808).

In the doSomething method, the resource adaptor uses the class loader layer interface, such as IClassLoadLayer in section 702 of FIG. 7, to call a doConversion method in the implementation class object which is loaded by the application class loader (step 810). The implementation class object calls the convert method in utility class, such as AppUtil, provided by the application (step 812). The utility class finds the objects and returns objects in data types that are accessible to resource adaptor (step 814). The resource adaptor then returns the objects to the application (step 816).

Figure 9:
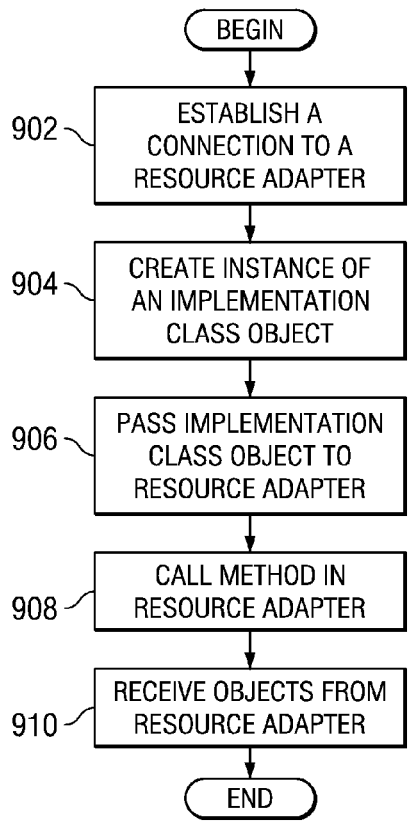
FIG. 9 illustrates a flowchart of an operation performed by an application in accordance with an illustrative embodiment.

FIG. 9 illustrates a flowchart of an operation performed by an application in accordance with an illustrative embodiment. The operation illustrated in FIG. 9 may be performed by an application such as application 606 of FIG. 6. As the operation begins, the application establishes a connection to a resource adaptor (step 902). The application creates an instance of an implementation class object (step 904) and passes the implementation class object to the set class loader layer interface in the resource adaptor (step 906). The implementation class object may contain one or more method that can be called by the application. The application then makes a call to a method in the resource adaptor, such as "doSomething", as described in 708 of FIG. 7 (step 908). The application then waits for a response from the resource adaptor, while the resource adaptor process the method call. This method call is described in more detail in FIG. 10 below. The application then receives a response from the resource adaptor (step 910) with the operation terminating thereafter.

Figure 10:
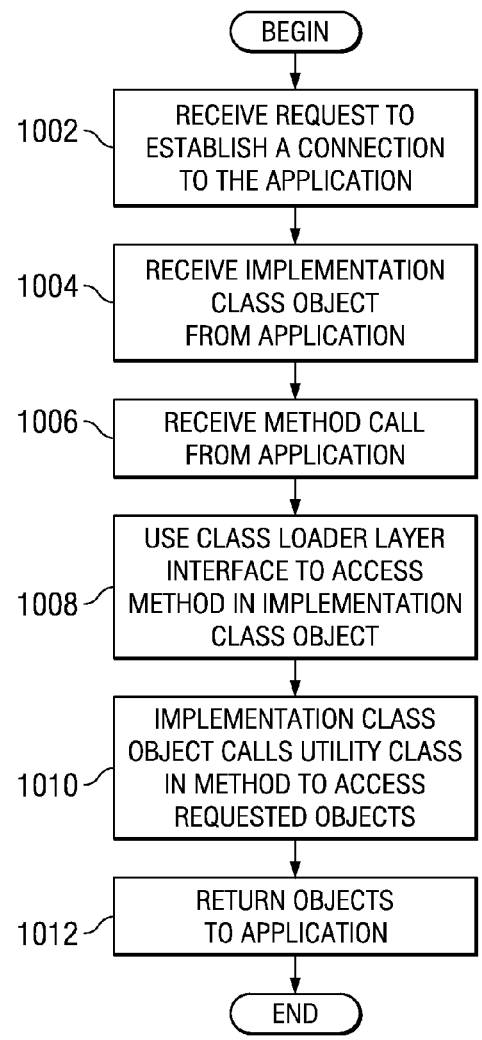
FIG. 10 illustrates a flowchart of an operation performed by a resource adaptor in accordance with an illustrative embodiment.

FIG. 10 illustrates a flowchart of an operation performed by a resource adaptor in accordance with an illustrative embodiment. The operation in this figure may be performed by a resource adaptor such as resource adaptor 604 of FIG. 6. As the operation begins, the resource adaptor receives a request from an application to establish a connection (step 1002). Then, the resource adaptor receives an implementation class object from the application that is to be executed by the class loader layer interface, which the resource adaptor stores (step 1004). The resource adaptor receives a method call from the application (step 1006). The resource adaptor then uses the class loader layer interface instantiated in the resource adaptor to access the method in the implementation class object (step 1008). The implementation class object calls a utility class to access the objects requested by the application (step 1010). Once the utility class returns the requested objects, then the resource adaptor returns the information to the application (step 1012), with the operation terminating thereafter.

Thus, the illustrative embodiments instantiate a class loader layer for an application. The class loader layer is an interface between the application and a resource adaptor and the class loader layer has access to all classes for the application. In response to receiving a request from the resource adaptor to invoke a function in the class loader layer, the function is executed to generate a set of objects with a set of data types accessible by the resource adaptor. The set of objects is sent to the resource adaptor. Thus, the class loader layer solution provides a way for both J2EE™ applications and J2EE™ Connector Architectures to access application-specific classes without having class-loading issues. With this solution, the application is still self-contained, and the application archive is not exposed to other applications.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adaptors may also be coupled to the system to enable the data processing system to become coupled to other data processing systems or remote printers or storage devices through intervening private or public networks. Modems, cable modem and Ethernet cards are just a few of the currently available types of network adaptors.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for obtaining data from an application, the computer implemented method comprising:

establishing a connection between an application and a resource adapter;

instantiating, by the application, a new instance of a class loader layer for the application, wherein the class loader layer is a connection interface between the application and the resource adaptor, wherein the class loader layer has access to all classes for the application;

passing, by the application, a class loader layer object to the resource adapter;

calling, by the application, a doSomething method provided by the class loader layer, wherein the doSomething method accesses a doConversion method in the application using the class loader layer object;
responsive to receiving a request from the resource adaptor to invoke the doSomething method in the class loader layer, executing the function to generate a set of objects with a set of data types accessible by the resource adaptor; and
sending the set of objects to the resource adaptor;
wherein the application has an application class loader, the resource adapter has a resource adapter class loader, the application and resource adapter share a common system class loader in a virtual machine of a computer.

2. The computer implemented method of claim 1, wherein an input and output to the class loader layer uses non-application specific data types.

3. The computer implemented method of claim 1, wherein the resource adaptor is a Java 2 Enterprise Edition Connector Architecture.

4. The computer implemented method of claim 1, wherein the application is a Java 2 Enterprise Edition application.

5. The computer implemented method of claim 2, wherein the non-application specific data types are basic Java data types.

6. The computer implemented method of claim 1, wherein the set of objects are associated with application-specific classes.

7. An apparatus for obtaining data from an application, the apparatus comprising:
one or more processors, one or more computer-readable memories, and one or more computer-readable, tangible storage devices;
an application;
a class loader layer; and
a resource adaptor;
program instructions stored in the one or more computer-readable tangible storage devices for execution by the one or more processors via the one or more computer-readable memories for establishing a connection between an application and a resource adapter;
program instructions stored in the one or more computer-readable tangible storage devices for execution by the one or more processors via the one or more computer-readable memories for instantiating, by the application, a new instance of a class loader layer for the application, wherein the class loader layer is a connection interface between the application and the resource adaptor, wherein the class loader layer has access to all classes for the application;
program instructions stored in the one or more computer-readable tangible storage devices for execution by the one or more processors via the one or more computer-readable memories for passing, by the application, a class loader layer object to the resource adapter;
program instructions stored in the one or more computer-readable tangible storage devices for execution by the one or more processors via the one or more computer-readable memories for calling, by the application, a doSomething method provided by the class loader layer, wherein the doSomething method accesses a doConversion method in the application using the class loader layer object;
program instructions stored in the one or more computer-readable tangible storage devices for execution by the one or more processors via the one or more computer-readable memories for responsive to receiving a request from the resource adaptor to invoke a function the doSomething method in the class loader layer, executing the function to generate a set of objects with a set of data types accessible by the resource adaptor; and
program instructions stored in the one or more computer-readable tangible storage devices for execution by the one or more processors via the one or more computer-readable memories for sending the set of objects to the resource adaptor;
wherein the application has an application class loader, the resource adapter has a resource adapter class loader, the application and resource adapter share a common system class loader in a virtual machine of a computer.

8. A data processing system comprising:
a bus system;
a communications system connected to the bus system;
one or more computer-readable memories and one or more computer-readable, tangible storage devices connected to the bus system; and
a processing unit having one or more processors connected to the bus system;
computer usable program code stored in the one or more computer-readable, tangible storage devices for execution by the one or more processors via the one or more computer-readable memories for establishing a connection between an application and a resource adapter;
computer usable program code stored in the one or more computer-readable, tangible storage devices for execution by the one or more processors via the one or computer-readable more memories for instantiating, by the application, a new instance of a class loader layer for the application, wherein the class loader layer is a connection interface between the application and the resource adaptor, wherein the class loader layer has access to all classes for the application;
computer usable program code stored in the one or more computer-readable, tangible storage devices for execution by the one or more processors via the one or more computer-readable memories for passing, by the application, a class loader layer object to the resource adapter;
computer usable program code stored in the one or more computer-readable, tangible storage devices for execution by the one or more processors via the one or computer-readable more memories for calling, by the application, a doSomething method provided by the class loader layer, wherein the doSomething method accesses a doConversion method in the application using the class loader layer object;
computer usable program code stored in the one or more computer-readable, tangible storage devices for execution by the one or more processors via the one or more computer-readable memories for executing, responsive to receiving a request from the resource adaptor to invoke the doSomething method in the class loader layer, the function to generate a set of objects with a set of data types accessible by the resource adaptor; and
computer usable program code stored in the one or more computer-readable, tangible storage devices for execution by the one or more processors via the one or more computer-readable memories for sending the set of objects to the resource adaptor;
wherein the application has an application class loader, the resource adapter has a resource adapter class loader, the application and resource adapter share a common system class loader in a virtual machine of a computer.

9. A computer program product comprising:
a non-transitory computer usable medium including computer usable program code for obtaining data from an application, the computer program product including:

computer usable program code for establishing a connection between an application and a resource adapter;

computer usable program code for instantiating, by the application, a new instance of a class loader layer for the application, wherein the class loader layer is a connection interface between the application and the resource adaptor, wherein the class loader layer has access to all classes for the application;

computer usable program code for passing, by the application, a class loader layer object to the resource adapter;

computer usable program code for calling, by the application, a doSomething method provided by the class loader layer, wherein the doSomething method accesses a doConversion method in the application using the class loader layer object;

responsive to receiving a request from the resource adaptor to invoke the doSomething method in the class loader layer, executing the function to generate a set of objects with a set of data types accessible by the resource adaptor; and computer usable program code for sending the set of objects to the resource adaptor;

wherein the application has an application class loader, the resource adapter has a resource adapter class loader, the application and resource adapter share a common system class loader in a virtual machine of a computer.

10. The computer program product of claim 9, wherein an input and output to the class loader layer uses non-application specific data types.

11. The computer program product of claim 9, wherein the resource adaptor is a Java 2 Enterprise Edition Connector Architecture and wherein the application is a Java 2 Enterprise Edition application.

12. The computer program product of claim 9, wherein the set of objects are associated with application-specific classes.

* * * * *